UNITED STATES PATENT OFFICE.

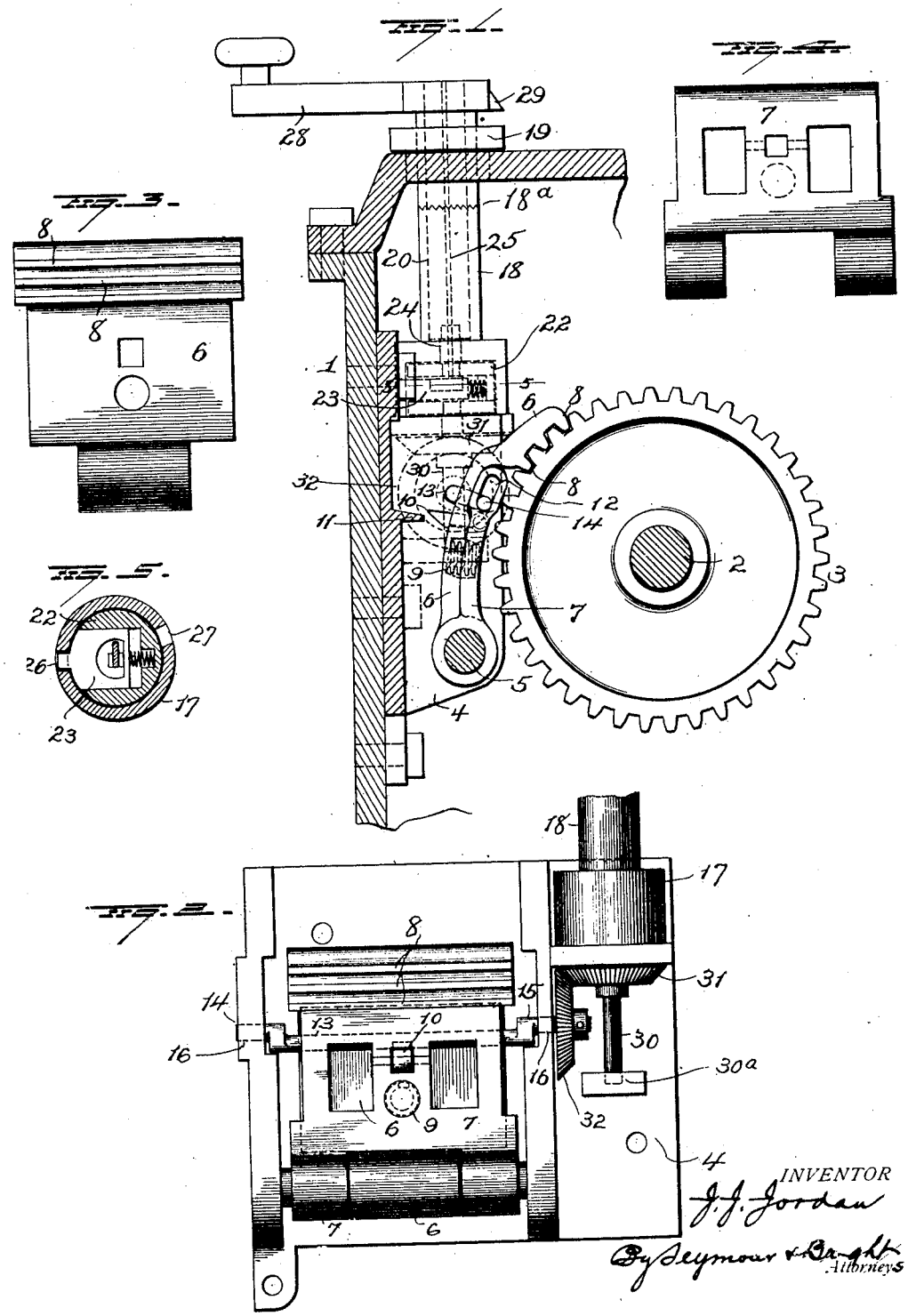

JOHN J. JORDAN, OF GOLDFIELD, NEVADA.

LOCKING MECHANISM FOR MOTOR-VEHICLES.

1,370,970.  Specification of Letters Patent.  Patented Mar. 8, 1921.

Application filed April 8, 1920. Serial No. 372,109.

*To all whom it may concern:*

Be it known that I, JOHN J. JORDAN, a citizen of the United States, and a resident of Goldfield, in the county of Esmeralda and State of Nevada, have invented certain new and useful Improvements in Locking Mechanism for Motor-Vehicles; and I do hereby declare the following to be a full, clear, and exact description of the invention, such as will enable others skilled in the art to which it appertains to make and use the same.

This invention relates to improvements in locking mechanism for motor vehicles and more particularly to such as are constructed to lock and unlock the gearing, one object of the invention being to provide simple and efficient means which shall be readily accessible for control by the operator of a motor vehicle, to effect the locking and unlocking of the gear set.

A further object is to so construct the locking mechanism that simple and efficient means shall be provided whereby one of the gears of the gear set may be positively locked in such manner that the entire transmission system may be locked and the driving wheels of the vehicle prevented from turning.

With these and other objects in view, the invention consists in certain novel features of construction and combinations of parts as hereinafter set forth and pointed out in the claims.

In the accompanying drawings; Figure 1 is a sectional view; Fig. 2 is a view in elevation with the gear of the transmission; Figs. 3 and 4 are separate views of the plates 6 and 7 and Fig. 5 is a section on the line 5—5 of Fig. 1.

1 represents a portion of a gear casing; 2 the main shaft of the transmission mechanism of a motor vehicle, and 3 one of the gears on said shaft, preferably the second speed gear.

A bracket or frame 4 is secured to the inner side of one of the upright walls of the gear casing and at its lower end a pin 5 is located. On this pin, two plates 6 and 7 are hinged, the plate 6 being provided with a plurality of teeth 8 to mesh with teeth of the gear 3 and lock said gear and hence the entire transmission mechanism. The hinged plate 6 is disposed in front of the locking plate 7 and is connected thereto by a spring 9, so that when these plates are moved toward the gear 3. the locking plate will be permitted to yield in the event that its teeth fail to mesh with the teeth of said gear, but a slight forward turning movement of the gear will permit the teeth of the locking plate to mesh with it and then the two plates 6 and 7 will be positively connected together by means of a latch 10 which is pivoted to the plate 7 and, passing through a hole in the plate 6, engages the latter. When the plates 6 and 7 are moved in a direction away from the gear 3 (by means hereinafter explained) the latch 10 will be released from locked engagement with the locking plate 6, by a beveled releasing lug 11 on the frame or bracket 4.

The hinged plate 7 is made at or near its free end with an elongated slot or opening 12, through which a cam or crank shaft 13 passes, said shaft being provided at its respective ends with crank arms 14—15 suitably mounted to turn in bearings 16 on the frame or bracket 4.

A lock casing 17 is supported by the frame or bracket 4 and a tube 18 extends upwardly from the casing and passes through the top of the gear casing 1. This tube may be made in two sections connected together as indicated at 18$^a$ and above the gear casing, said tube may be provided with a fixed collar or enlargement 19. A key plug 20 is revolubly mounted in the tube 18 and within the lock casing 17 a frame 22, carrying a spring pressed bolt 23, is mounted to turn. A spindle 24 is mounted in the top of the lock casing and engages a socket in the lower end of the key plug so as to turn with the latter, said spindle being also made to engage in a socket in the top of a bolt-carrying frame 22 so as to turn the latter when the plug is turned. The plug 20 and spindle 24 are slotted as at 25 to receive a key whereby the bolt 23 carried by the frame 22 may be withdrawn from engagement with one or another of sockets 26 or 27 in the lock casing 17. A crank handle 28 is secured to the upper end of the plug 20 for turning the latter when it shall have been released by operation of the bolt and this crank handle may be provided with a pointer 29. A shaft 30 is mounted in the bottom of the lock casing 17 and in a bearing 30$^a$ and engages in a socket in the bolt-carrying frame 22 so as to be rotated by the latter. To this shaft a beveled pinion 31 is secured. The pinion 31 meshes with another beveled pinion 32 secured to the crank 15 of the cam shaft 13.

When it is desired to lock the gearing,— viz. to move the locking plate 6 into mesh with the gear 3 (as shown in Fig. 1) the operator will, with the use of his key, withdraw the bolt of the lock from engagement with the lock casing and thus release the tumbler. The operator will then turn the plug 20 by means of the crank handle 28 and cause motion to be transmitted through the pinions 30 and 31 to the cam shaft 13. The turning of the shaft 13, coöperating with the slotted plate 7, will cause the locking plate 6 to move to position to engage the gear 3 and lock the transmission gearing of the machine. When the gearing shall have been thus locked, the bolt 23 of the lock will engage in the socket or opening 26 in the lock casing and the plate 6 will be held in locked relation to the gear 3. To unlock the gearing, the use of the key is necessary to unlock the plug from the lock casing, before said plug can be turned to cause the locking plate 6 to be moved away from the gear 3, and when the gearing shall have been unlocked, the lock bolt 23 will engage in the socket 27 in the lock casing. By connecting the plug 20 with the bolt-carrying frame 22 of the lock in the manner hereinbefore described, these parts will be separable, so that should the plug be forced off, the gear locking mechanism will not be disturbed.

I do not wish to restrict myself to any specific type of lock mechanism to hold the plug in the position to which it may be turned, and various changes might be made in the details of construction of my invention without departing from the spirit thereof or limiting its scope and hence I do not wish to restrict myself to the exact details herein set forth.

Having fully described my invention what I claim as new and desire to secure by Letters-Patent, is:—

1. In locking mechanism for a motor vehicle, the combination of a movable gear locking member, a lock casing provided with a tubular extension, a revoluble member mounted in said tubular extension and having a key-way, a locking bolt in said lock casing, gearing between said revoluble member and said gear locking member, and means whereby said revoluble member may be manually operated to effect movement of said gear locking member relatively to a gear.

2. In locking mechanism for a motor vehicle, the combination of a toothed gear-locking member, a slotted member, means whereby said members are movably supported, a yielding connection between said members, a cam shaft having a part movable in the slot of said slotted member, a manually operable member, a lock for said manually operable member, and gearing between said cam shaft and said manually operable member.

3. In locking mechanism for a motor vehicle, the combination of hinged gear-locking member, a hinged member having a slot, a cam shaft having a crank arm mounted to move in said slot, a spring connecting said members, a latch carried by one of said members and adapted to engage the other member, means for releasing said latch when said members are withdrawn, a manually operable member, a lock for locking said manually operable member, the latter having a key-way leading to the bolt of said lock, and gearing between said manually operable member and said cam shaft for operating the latter to move the gear locking member relatively to the gear when said manually operable member shall have been released by the operation of said lock and turned.

4. In locking mechanism for a motor vehicle, the combination of a hinged toothed member to engage a gear associated with the transmission mechanism, a lock, a revoluble member separably connected therewith, means for manually turning said revoluble member, and gearing operable by said revoluble member for shifting said hinged toothed member relatively to the gear with which it is adapted to coöperate.

In testimony whereof, I have signed this specification in the presence of two subscribing witnesses.

JOHN J. JORDAN.

Witnesses:
 G. S. WARDLE,
 JOSEPH MAYER.